July 25, 1967  F. J. LUKETA  3,332,664
WINCH FOR HAULING TRAWLS
Original Filed Dec. 31, 1962  7 Sheets-Sheet 1

INVENTOR.
FRANK J. LUKETA
BY
Robert W. Beach

ATTORNEY

July 25, 1967  F. J. LUKETA  3,332,664
WINCH FOR HAULING TRAWLS
Original Filed Dec. 31, 1962  7 Sheets-Sheet 2

INVENTOR.
FRANK J. LUKETA
BY
Robert W. Beach
ATTORNEY

July 25, 1967 F. J. LUKETA 3,332,664
WINCH FOR HAULING TRAWLS
Original Filed Dec. 31, 1962 7 Sheets-Sheet 6

Fig. 13.

INVENTOR.
FRANK J. LUKETA
BY Robert W. Beach
ATTORNEY

July 25, 1967

F. J. LUKETA 3,332,664

WINCH FOR HAULING TRAWLS

Original Filed Dec. 31, 1962

INVENTOR.
FRANK J. LUKETA
BY
Robert W. Beach
ATTORNEY

United States Patent Office 3,332,664
Patented July 25, 1967

3,332,664
WINCH FOR HAULING TRAWLS
Frank J. Luketa, 5567 Greenwood Ave. N.,
Seattle, Wash. 98103
Continuation of application Ser. No. 248,678, Dec. 31, 1962. This application Aug. 22, 1966, Ser. No. 573,940
10 Claims. (Cl. 254—184)

This application is a continuation of my United States patent application Ser. No. 248,678, filed Dec. 31, 1962, for Winch for Hauling Trawls, which was a continuation-in-part of my United States patent application Ser. No. 836,636, filed Aug. 28, 1959, for Winch for Hauling Trawl Nets, and now abandoned.

A standard trawl has wings and lines connecting the trawl body with the towing warps and the doors that diverge forwardly during trawling. In special type of trawl unstressed curtains diverge forwardly from the body of the trawl which are of a length many times the length of the wings of standard trawls. Such wings are suspended from buoyant lines. As used in the following description "divergent sections" of the trawl refers to the wings and/or the lines diverging forwardly from the trawl body during trawling.

The winch of the present invention was designed particularly to haul such trawls and to deposit the trawl cod end onto the deck of the trawler by winding the entire trawl on a single drum.

For hauling a trawl it is an object to provide a winch having side reels by which the divergent sections of the trawl are hauled and a central reel between the side reels on which the trawl body and cod end are wound without disconnecting such divergent sections from the trawl body.

It is a further object to provide auxiliary reels outboard from the side reels, if desired, on which trawl handling lines can be wound.

Another object of the invention is to provide such a compound reel winch the drum of which can be rotated by a single motor, and auxiliary drum winding mechanism is provided so that if such motor should fail while the trawl is in use it can still be reeled in without the delay necessary to repair the single motor being incurred.

It is a specific object to provide a central trawl body reel and relatively narrow reels at opposite sides of such trawl body reel for receiving divergent sections of the trawl, and providing for initially winding such divergent sections simultaneously on the side reels and thereafter winding the body portion of the trawl on the central reel in two distinct sequential operations, and to provide winch construction to facilitate such sequential operations.

Another specific object is to integrate the reel flanges and the central drum of the winch with the drive mechanism in a fabricated construction, which will enable the parts to be assembled easily and quickly, while insuring that the assembled structure will have adequate strength and rigidity. It is an incidental object to enable such parts to be disassembled readily, if desired.

A further object is to provide a compact and convenient mounting for the winch drum drive mechanism.

The foregoing objects can be accomplished by providing a winch construction in which a hollow drum is journaled in the winch frame to rotate about a substantially horizontal axis, and to such drum are fixed at least four reel flanges in positions spaced lengthwise of the drum. Each of these flanges is preferably of a radius equal to a plurality of times the diameter of the drum and such four flanges include two inner flanges, the peripheries of which are spaced apart at least half as far as the outer flanges are spaced, so as to form a reel between the inner flanges for receiving at least the body portion of a trawl and comparatively narrow reels between each outer flange and the adjacent inner flange for receiving at least portions of the divergent sections of the trawl. The peripheries of the inner flanges have notches substantially in registry lengthwise of the drum to receive portions of the divergent sections of the trawl wound on the side reels adjacent to the body portion of the trawl wound on the central reel. The adjacent sides of the inner flanges are substantially frustoconical shape to wedge the trawl body toward the central portion of the trawl body reel to keep it clear of the notches in the peripheries of the inner flanges. The opposite ends of the drum are carried by plugs received in the drum ends and mounted on stub axles, one of which carries a drive gear which is turned by a motor floatably mounted in the winch frame. A cable drive may be provided for turning the winch drum in case the drum driving motor should fail.

Figure 3:
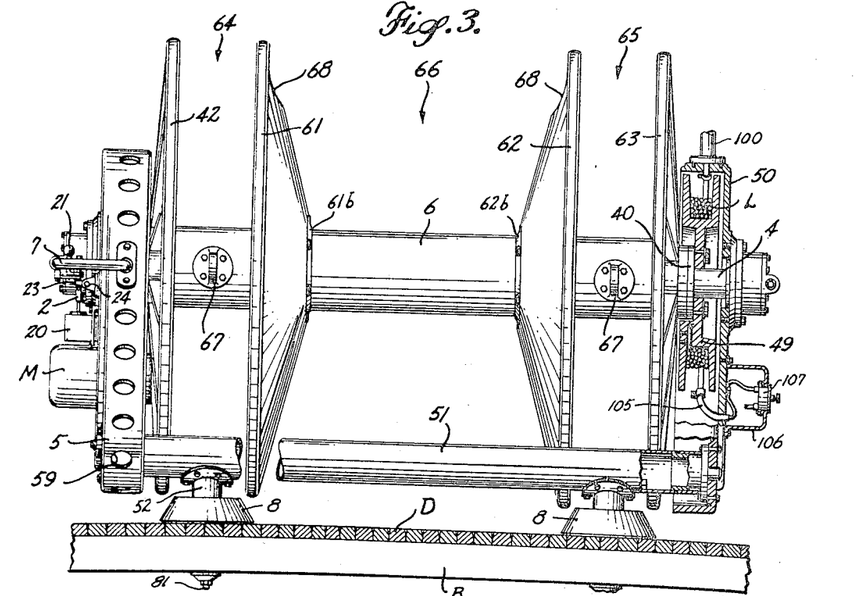
FIGURE 3 is an aft elevation of the winch, with parts broken away.
Figures 4, 10:
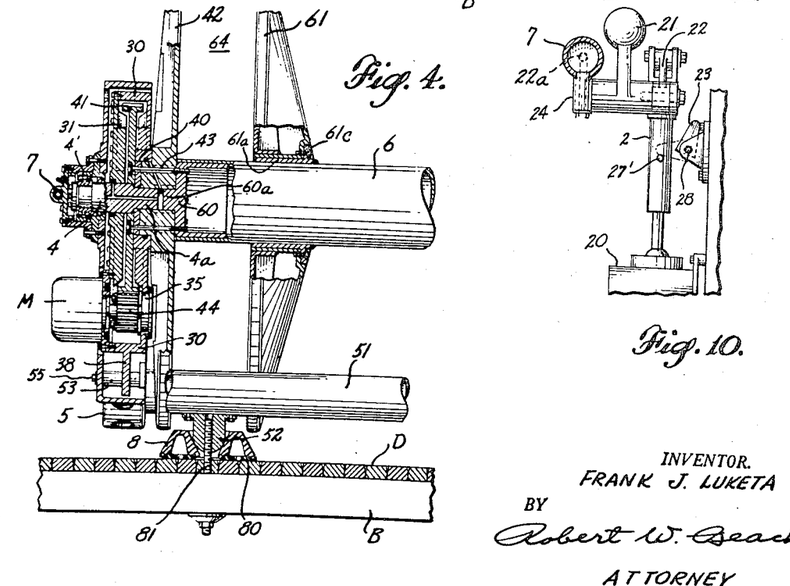
FIGURE 4 is a corresponding elevation of the port end portion of the winch, having parts broken away.
FIGURE 10 is a detail elevation of which control mechanism, parts being shown in section.
Figure 11:
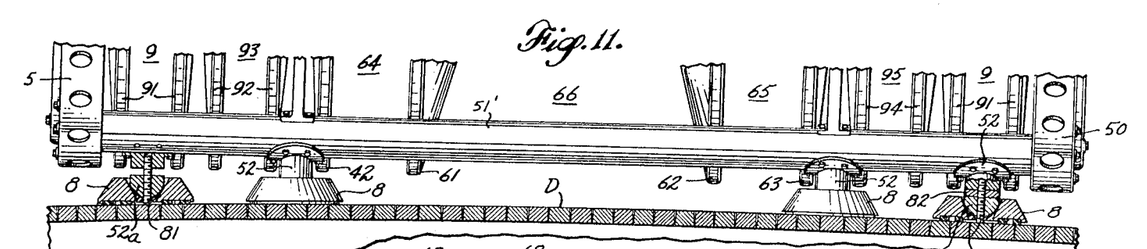
FIGURE 11 is an aft elevation of the lower portion of a modified type of winch, parts of which are broken away.

The present invention is particularly adapted to haul a trawl of the type disclosed in my companion United States patent application Ser. No. 834,030, filed Aug. 17, 1956, for Trawl Net Especially for Bottom Fishing. Such a winch is mounted upon and after or amidships deck of a trawler, of which the deck D and deck beams B are shown in FIGURES 3, 4 and 11. The winch will be mounted with its rotative axis extending athwartships of the trawler and substantially perpendicular to the fore and aft center line of the trawler. The winch includes end frames 5 and 50, each of generally skeletonized triangular form of angle cross section, having lightening holes in one or both flanges. The bottom portions of such two end frames are connected by struts 51, shown in FIGURES 1, 2 and 3, extending parallel to the rotative axis of the winch and spaced apart fore and aft.

The winch is supported and anchored on the trawler deck by feet 52 mounted on and depending from the longitudinal struts 51 near the end frames 5 and 10, respectively. Each foot has a ball-shaped lower end received in the conical socket of a deck pad 8, which rests on a gasket 80 on the deck D. Each winch foot is secured to the trawler deck in its proper position by a hold-down bolt 81, extending from beneath a deck beam B, up through the deck D and the deck pad, and is screwed into a tapped bore extending axially of the foot and radially of its ball end.

Figure 1:
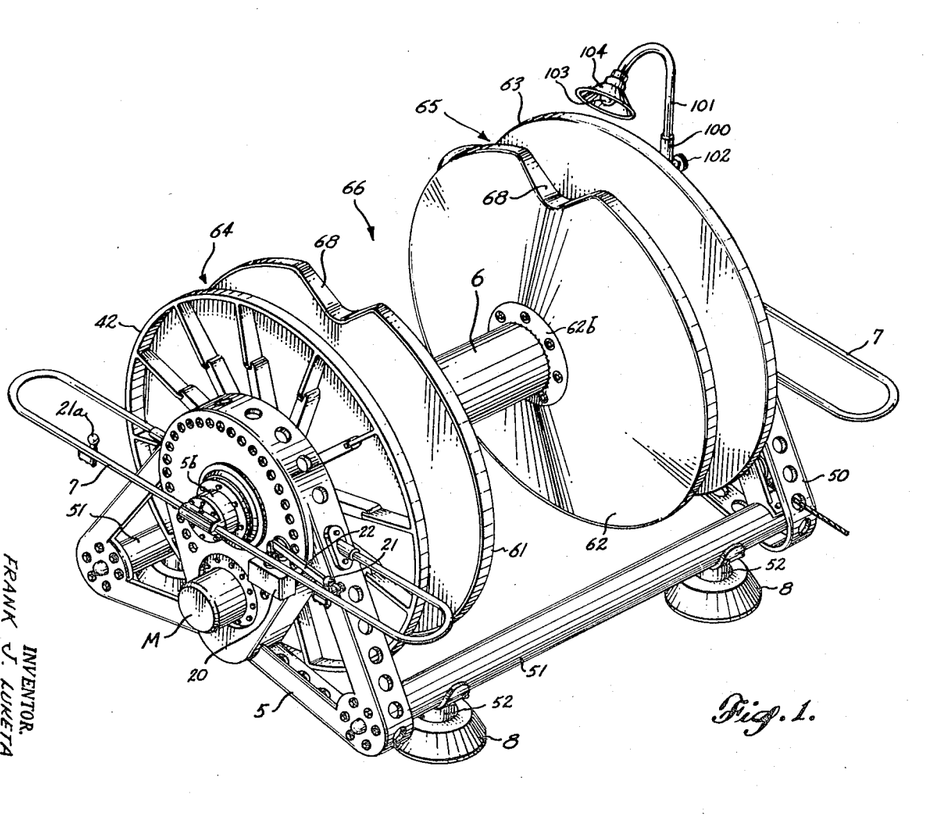
FIGURE 1 is an aft top perspective of the winch.
Figures 2, 5:
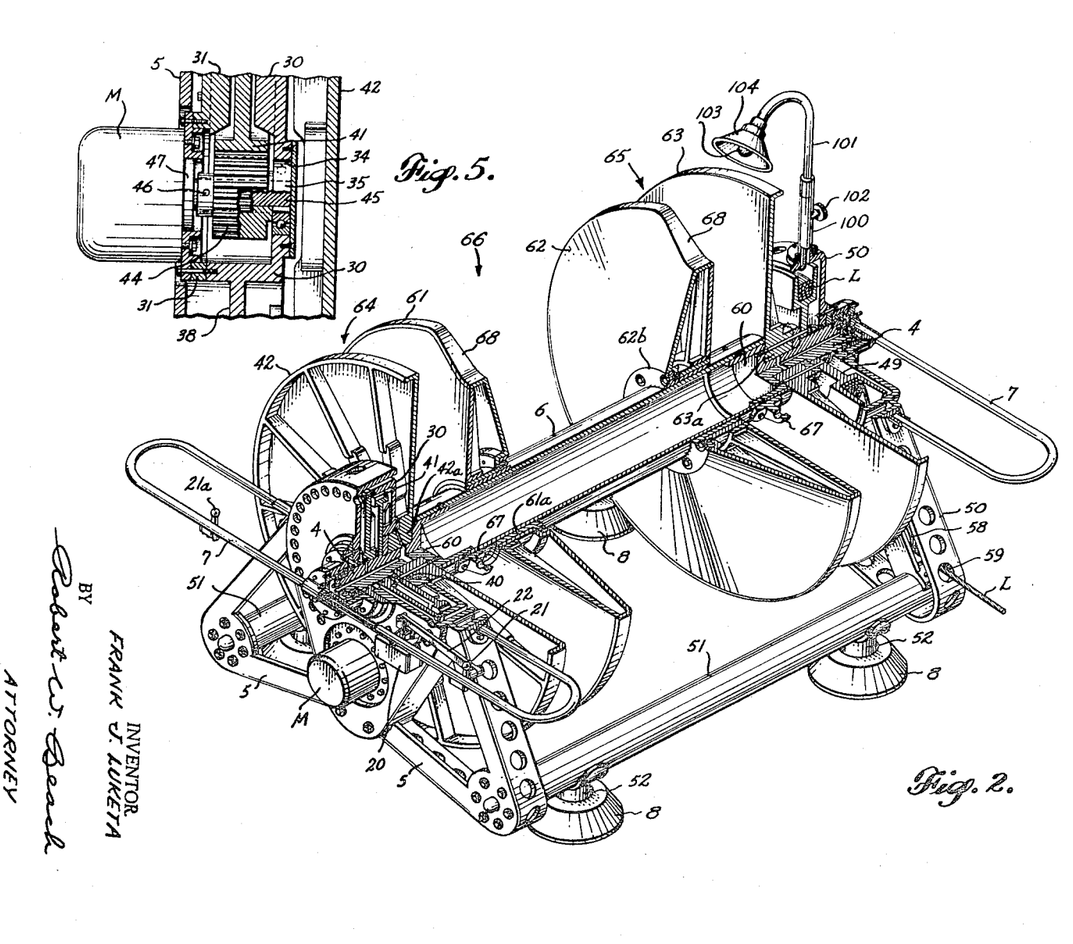
FIGURE 2 is a similar view with parts broken away.
FIGURE 5 is an enlarged detail section of a portion of FIGURE 4.

The winch itself shown in FIGURES 1 to 10 and 12 to 14, inclusive, includes a substantially horizontal drum 6 of tubular construction, as shown in FIGURE 2, the opposite ends of which are carried by cup-shaped plugs 60 extending into and fitting closely within the drum ends. Such drum ends are secured to these plugs by plug welds extending through the end portions of the drum, as shown in FIGURE 2 and FIGURE 13. In axial alignment with the opposite ends of the winch drum 6 and plugs 60, are stub shafts 4, the outer ends of which are journaled in the winch end frames 5 and 50, respectively, by heavy-duty antifriction bearings 4'. On such stub shafts are welded or otherwise secured disks 40 of a radial extent substantially corresponding to the radial extent of the plugs 60. The stub shafts 4 constitute a component part of the winch drum and consequently must be integrated with the drum tube.

In order to provide the necessary side reels on which to wind the divergent sections of the trawl, and a center reel on which to wind the trawl body, four reel flanges are mounted on the drum which include two outer flanges 42 and 63 and two inner flanges 61 and 62 between such outer flanges. As will be evident from FIGURE 3, it is preferred that all of these flanges be of approximately the same diameter and the radius of each flange preferably is a plurality of times as great as the diameter of the winch drum 6, so as to provide reels of adequate depth to receive the trawl parts. The reel disks shown in FIGURE 3 have a radius almost three times as great as the diameter of the drum tube 6. Moreover, in order to provide adequate room for the trawl body the spacing between the inner flanges 61 and 62 is at least half as great as the distance between the outer reel flanges 42 and 63 lengthwise of the winch drum. Consequently, the axial widths of the side reel 64 between flanges 42 and 61, and of the side reel 65 between flanges 62 and 63, will together be not more than half as great as the axial extent of the drum 6 between outer flanges 42 and 63.

The portions of the winch drum 6 in the side reel 64 between flanges 42 and 61, and in the side reel 65 between the flanges 62 and 63, have anchor eyes 67 secured to them, as shown in FIGURE 3, to which the respective forward ends of the divergent sections of the trawl can be anchored. The winch can then be rotated to wind in such divergent sections onto the two side reels 64 and 65 until these reels are nearly filled and the body of the trawl interconnecting the aft or trailing ends of the divergent sections is approaching the winch. Such reeling in of divergent sections and of the trawl body requires the exertion of a heavy pull by the winch. Consequently, it is not practical simply to continue reeling in the trawl to allow the central portion or body of the trawl to flop over the reel flanges 61 and 62 at random and start winding on the central reel, because it is probable that the trawl would be pulled unevenly, or caught and torn.

Figures 6, 7, 8, 9:
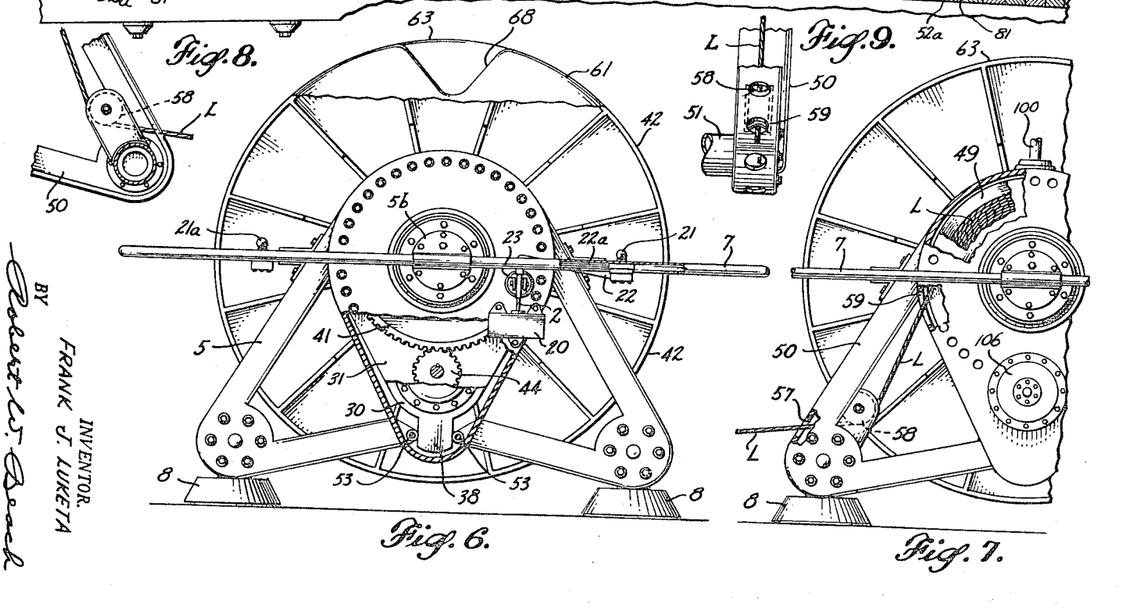
FIGURE 6 is a port end elevation of the winch and FIGURE 7 is a starboard end elevation of a portion of the winch, with parts broken away in each instance.
FIGURE 8 is an elevation of a detail of the winch mechanism and FIGURE 9 is an elevation of the same detail taken perpendicular to FIGURE 8.

Consequently, temporary anchoring rings may be provided on the trawl at the bases of the curtains adjacent to the trawl body, which are anchored to the trawler temporarily when the body of the trawl approaches the winch, and the winch can then be slacked off slightly. In the peripheries of the reel flanges 61 and 62 are notches 68 which are located in registry axially of the winch and, as shown best in FIGURE 6, are of a radial extent a small fraction of the full radial extent of the reel disk, being shown as being approximately one-quarter of the disk's radial extent in depth. Portions of the divergent sections of the trawl are deflected from the side reels 64 and 65 through such notches to the central reel and the winding rotation of the drum can then be resumed. As the winch continues to turn the portions of the divergent sections of the trawl adjacent to the trawl body, and then the central portion of the trawl body, will be wound upon the central reel 66.

The adjacent sides of the two inner reel flanges 61 and 62 flare outwardly and toward the drum ends, so that the central portion of the reel is narrower than the peripheral portion. Preferably, such reel sides are of substantially frustoconical shape. As the stress is exerted by the winch on the portions of the divergent sections of the trawl in pulling in the trawl, therefore, engagement of such divergent sections with the flaring sides of the central reel will effect a wedging action which moves the divergent sections toward the center of the reel, although the central portion of the trawl body adjacent to the divergent sections may be much wider than the axial extent of the reel 66. The portions of the divergent sections adjacent to the trawl body will thus be held inward to clear the peripheral notches 68 of the flanges 61 and 62 so that the trawl will not be caught and torn by such notches, and the trawl will be wound to a more uniform depth on the central reel. Rotation of the winch drum can then be continued to wind the central body of the trawl and finally the cod end on the reel 66.

In order to rotate the reels 64, 65 and 66 as a unit all of the flanges 42, 61, 62 and 63 are fixed to the drum 6. The flanges 61 and 66 are mounted on the surface of the drum so that such flanges are removable from the drum, and when secured on the drum are precisely perpendicular to its axis. Thus, as shown in FIGURES 4 and 13, spaced collars 61a and 62a are fitted snugly onto the drum 6 and are welded in place at locations corresponding to the positions in which the flanges 61 and 62 are to be mounted, as described above. On the adjacent ends of these collars are flange-securing projections which may be simply circumferentially spaced lugs, but preferably are annular rigs 61b and 62b, to which the flanges 61 and 62, respectively, are removably secured. Such collars and lugs or ribs are machined after the collars have been welded to the drums so that the exterior surface of the collars will be accurately cylindrical and coaxial with the axis of the drum, and the flange-engaging sides of the lugs or ribs will be precisely in a plane radially of the drum axis. Each of the flanges can be made of cast aluminum having a hollow interior, as shown in FIGURES 2 and 13, in which suitable stiffening ribs extending radially are provided.

The flange tapers in thickness from its root toward its periphery to provide the side of substantially frustoconical shape facing toward the central portion of the drum, as discussed above. The broad central ring of these flanges will fit snugly on their respective collars 61a and 62a, as shown in FIGURE 4. At the central portion of the inclined side of each flange is a recess 61c on flange 61, as shown in FIGURE 4, and 62c on flange 62, as shown in FIGURE 13. These recesses are of a size to receive in them the ribs 61b and 62b, respectively. Such ribs and the root portions of the flanges at the bottoms of the recesses are drilled correspondingly at circumferentially spaced locations, and the holes in the flanges are tapped to receive bolts extending through the annular ribs to secure the reel flanges to the collars mounted on the winch drum. As shown in FIGURE 13, the holes in the collar ribs are countersunk to accommodate the bolt heads, so that they will not project beyond the sides of the ribs on which the trawl might catch.

The end flanges 42 and 63 have central portions which are thinner than the central portions of the flanges 61 and 62. Consequently, instead of the central portions of such flanges engaging the outer peripheries of collars on the drum, such flanges are stiffened by being clamped against the opposite ends of the drum tube 6, as shown best in FIGURES 2 and 4. The outer side of each plug 60 is located substantially flush with the corresponding drum end and the plug has a boss 60a, shown in FIGURE 13, projecting toward the stub axle 4. Such stub axle has a corresponding boss 4a, shown in FIGURE 12, of equal and similar cross section projection toward the plug 60. The composite length of these bosses is somewhat less than the axial width of the hub 42a of flange 42 and hub 63a of flange 63. Consequently, the adjacent ends of such bosses will be spaced apart slightly, as shown in FIGURE 4, when the stub axle 4, drum 6 and flanges 42 and 63 have been assembled with the bosses 4a and 60a projecting as far as possible into the respective flange hubs.

In order to drive the drum 6 and flanges 42, 61, 62 and 63 rotatively a bull gear 41, received in a housing 30 at the port end of the winch, must be secured to the drum. As shown in FIGURE 4, the web of this bull gear is apertured to fit snugly on the stub axle 4 and such web is placed in face-to-face contact with the outer side of the flange 40 of stub axle 4. The opposite side of such flange is in face-to-face engagement with the adjacent end of the hub 42a of the reel flange 42, as shown in FIGURES 2 and 4. As shown best in FIGURES 12 and 13, the web of the bull gear 41, flange 40, hub 42a of flange 42 and the web of plug 60 are all drilled correspondingly with axially extending holes spaced circumferentially. The apertures in the web of plug 60 are somewhat smaller than the other apertures and are tapped so that bolts 43, appearing in FIGURE 4, can extend through the web of the bull gear, the flange 40, the flange hub 42a and be threaded into the web of plug 60 to draw these parts together and secure them into a unitary structure. The bolt-receiving apertures in the bull gear web can be countersunk, as shown in FIGURES 12 and 4, to receive the heads of the bolts flush with the outer face of such web.

The bull gear is driven by a pinion 44 meshing with it as shown in FIGURE 4, which pinion is mounted on the shaft of a motor drive M. This motor drive is preferably of the hydraulic type, although it may be electric and may include suitable reduction gearing, if a high speed motor is used. The motor drive is mounted on the lower portion of the bull gear housing 30, which is closed by the cover plate 31. These parts are shown in FIGURE 12 as including a large circular portion of a size to fit over and enclose the bull gear 41 and a smaller circular arcuate shape in which the gear driving pinion 44 is housed. The housing 30 has an aperture 32 which fits on the hub 42a of the end reel flange 42, as shown in FIGURE 4, and encircles flanges 40 of the stub shaft 4. The housing cover plate 31 also has in it a central aperture 33 which fits on the stub shaft 4 with a bearing fit. A bore extends axially through the stub shaft 4 and its end cap 4b, through which lubricant can flow from a cavity formed within the end cap 5b to the space between the boss 4a of the stub shaft 4 and the boss 60a on the end of plug 60. From the stub shaft bore a radial hole extends to the bearing space between the stub shaft and the housing cover plate aperture 33, and another passage extends from the space between the bosses 4a and 60a to the space between the housing aperture 32 and the hub 42a of reel flange 42. Lubricant is thus supplied to the surfaces between the nonrotative apertures 32 and 33 of the gear housing and the rotative stub shaft and flange hub.

Figure 12:
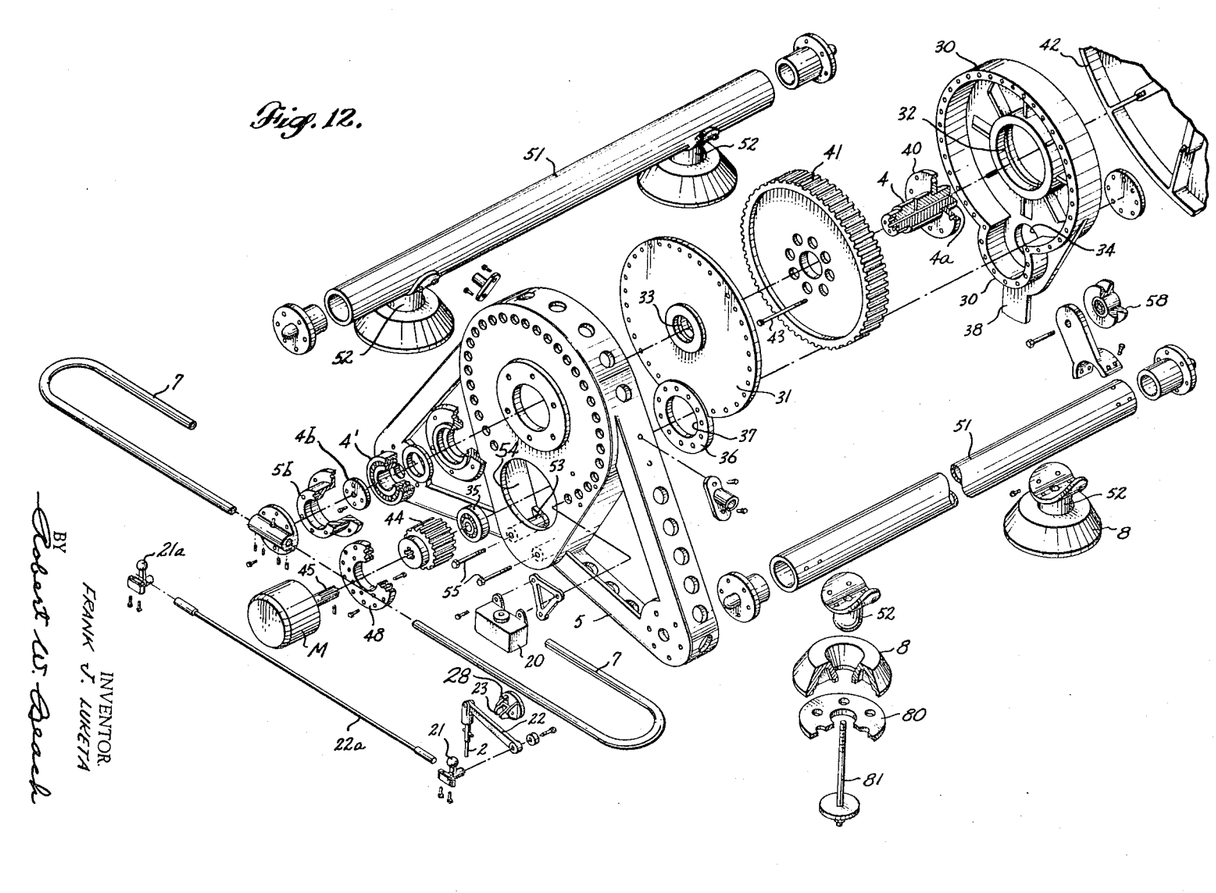
FIGURE 12 is a top perspective of principally the port end portion of the winch shown in FIGURES 1, 2 and 3, parts being shown in exploded relationship, and most of such parts also being utilized in the winch of FIGURE 11, parts being broken away.
Figure 13:
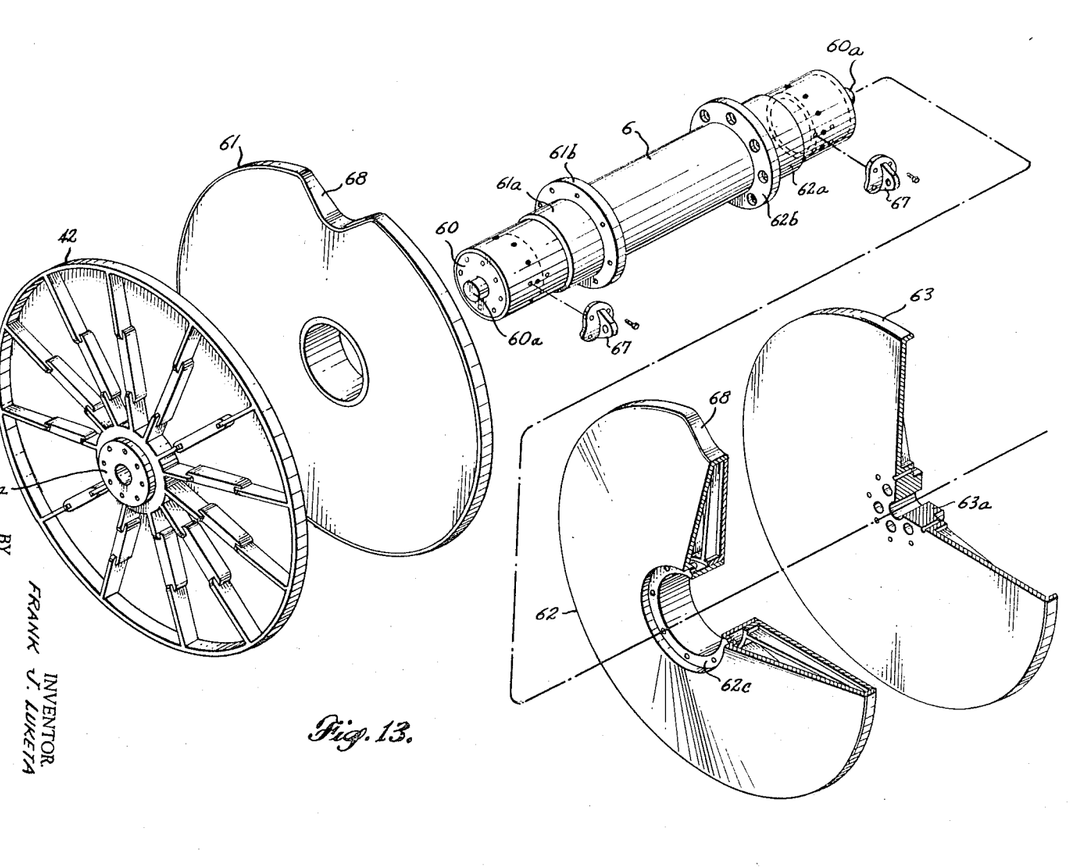
FIGURE 13 is a top perspective of reel-forming components, in exploded relationship, of the winch shown in FIGURES 1, 2 and 3, the winch of FIGURE 11 also embodying parts corresponding to most of the parts illustrated in such figures, parts being broken away.

The lower portion of the radial wall of housing 30 has in it an aperture 34 of a size to receive in it the outer periphery of the antifriction bearing 35, shown in FIGURES 4, 5 and 12, which supports one end of the motor drive shaft 45. The gear 44 is fitted onto a splined portion of such shaft and is held in the shaft by the radial pin 46, having a light press fit in a hole extending diametrically through such shaft. The motor drive M has a projecting shoulder 47 which fits into a ring 48 and such drive is bolted to that ring. The outer portion of the ring is bolted to the downwardly projecting portion 36 of housing end plate 31, as shown in FIGURE 12. The motor drive M projects from this gear housing outward through an aperture 54 in the end frame 5 which is larger than the motor drive.

Thus, the motor drive M and pinion 44 are mounted entirely on the bear housing 30, 31, which in turn is floatably supported on the flange hub 42a and the stub shaft 4, so that there is no possibility of the motor drive shaft 45 being shifted out of parallelism to the axis of the winch drum 6, irrespective of any inaccuracy in mounting the winch or twisting of the winch frame resulting from unequal loading of the winch drum. Turning of housing 30, 31 through any appreciable angle around the axis of the drum 6 is limited by engagement of the torque arm 38, shown in FIGURES 4 and 12, being fitted between two tubes 53 and secured in the lower portion of the end frame 5 by bolts 55 in positions flanking opposite edges of such torque arm. The swinging of the motor drive M permitted by such rotation of the gear housing will be sufficiently limited to prevent engagement of the motor drive with the edge of the frame aperture 54.

Any tendency of pinion 44 to move circumferentially around the bull gear 41 instead of turning such bull gear relative to the winch frame is limited because such circumferential movement of the pinion would require turning of the gear housing 30, 31 carrying the pinion and motor drive. As the torque of the motor drive is transmitted through the pinion 44 to turn the bull gear 41, the reaction to such force on the housing 30, 31 is transmitted to the winch frame through the torque arm and to one or the other of tubes 53 and bolts 55, depending upon the direction in which the bull gear is being turned, constituting abutment means.

The motor M is reversible so that the drum can be driven in one direction for reeling in the trawl, and in the opposite direction for paying out the trawl. The direction of rotation and speed of the drum 6 are controlled by tilting a control arm 2 either fore or aft from a neutral upright position. The speed of the motor will be regulated by the degree of tilt of such control arm. Control handles 21 and 21a are connected together by a rod 22a extending through a hollow guardrail 7, and such handles are connected to the control arm 2 by link 22. Such control handles may therefore be slid along guardrail 7 in either direction from a neutral position in which the motor is stopped. Increasing displacement of the control handles in one direction from such neutral position will increase the speed of rotation of the motor drive in one sense, and displacement of the control handles from such neutral position in the opposite direction will progressively increase the speed of the motor in the opposite sense. The control arm 2 and the control handles 21 and 21a can be secured in their neutral position to prevent inadvertent energization of the motor drive M by swinging downward, to flank the control arm 2, spaced fingers 23 of a yoke swingably mounted on the end frame 5 by a pivot 23.

If the motor drive M should fail for any reason when the trawl is being towed it is desirable to provide emergency drive mechanisms for turning the winch drum to reel in the trawl. Such emergency winch drive mechanism is shown, particularly in FIGURES 2, 3 and 14.

The mounting of the stub shaft 4 at the starboard end of the winch is generally the same as the mounting described and shown best in FIGURE 4 at the port end of the winch, except that the bull gear 41 and its housing are omitted. At the starboard end of the winch an auxiliary winch drum 49 is mounted on the stub shaft 4 and secured to the reel flange 63, plug 60 and winch drum 6 in a manner similar to the assembly of the bull gear on the port end of the winch drum, as described.

Figure 14:
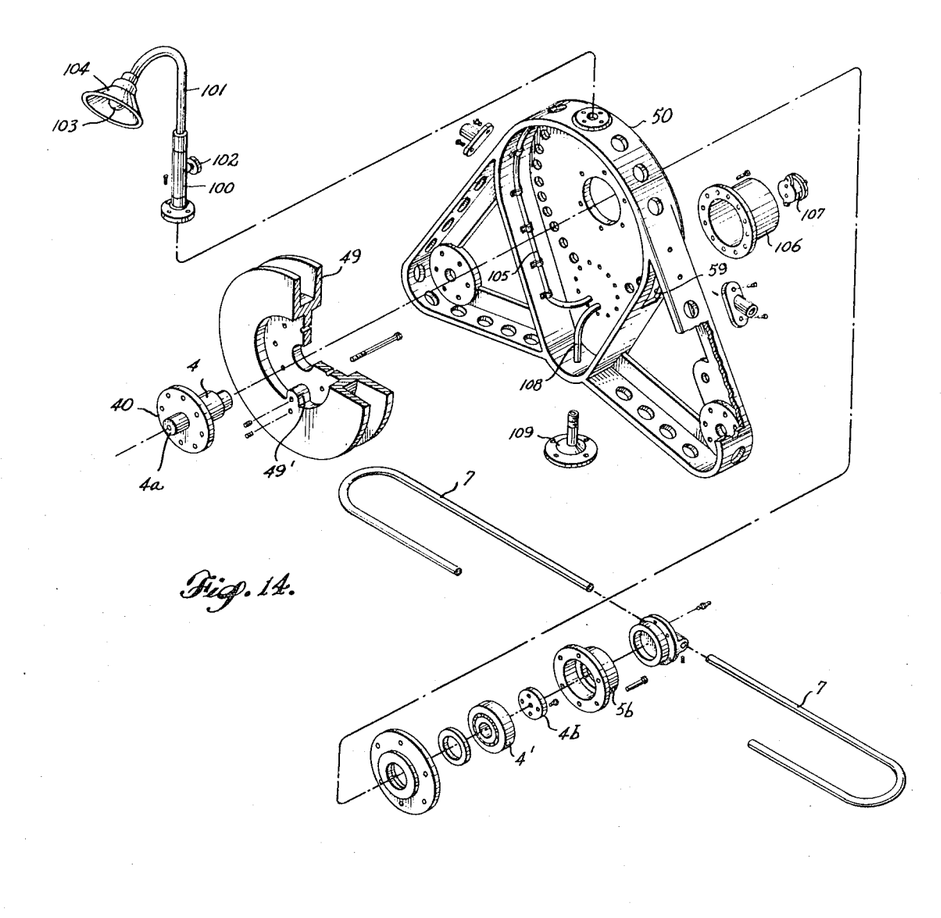
FIGURE 14 is a top perspective of components, in exploded relationship, which are embodied in the winches of both FIGURES 1 to 3, inclusive, and FIGURE 11, having broken away.

As shown in FIGURE 14 an enlargement 49' is formed on the reel 49 projecting inward from the rim portion of the reel and located alongside its flange. At the location of this enlargement a radial hole is drilled into which the end of a cable to be anchored to the drum is thrust, and such cable end is secured in place by set screws screwed into tapped holes in the enlargement and bearing on the cable end. The end of such a cable L can be thus secured to the auxiliary drum 49 when the trawl is wound in stored condition on the reels 64, 65 and 66. The end of such cable or line is fed to the auxiliary drum through an aperture 57 in the winch end frame 50 and then around a guide sheave 58 and through a hole 59 in the auxiliary drum casing portion of the end frame as shown in FIGURE 7.

Because the end of the line L is anchored to the auxiliary winch drum 49 and such winch drum is secured to the main winch drum 6 as described above, rotation of the main winch drum will wind the line L on the auxiliary drum 49. If the end of line L is secured to the auxiliary drum when the trawl is wound on the reels, rotation of such auxiliary drum effected by paying out of the trawl will wind the line on the auxiliary drum as shown in FIGURES 3 and 7 until when the reels are empty as shown in FIGURE 3, the length of line wound on the auxiliary drum will correspond to the length of the trawl unwound from the main drum. If the motor drive M should fail, therefore, the drum 6 can be rotated to reel in the trawl by pulling line L to unwind it from the auxiliary drum. The line can be pulled in this manner by being attached to the towing cable winch used to tow the trawl while fishing or some other suitable powered cable winding device or even a hand-operated capstan.

The multiple drum winch shown in FIGURE 11 utilizes the same general type of construction as the winch shown in FIGURES 1, 2 and 3, which has been described above, and most of the parts are the same. Thus the trawl winding reels 64, 65 and 66 are composed of end flanges 42 and 63 and intermediate flanges 61 and 62 mounted on a common drum in relationships corresponding to the relationships of such reel flanges shown in FIGURES 3. The struts 51' supported by the feet 52 are similar to the struts 51 of the smaller winch, but simply are longer. Also the end frames 5 and 50 connected by the struts 51' are essentially the same as the end frames of the winch shown in FIGURES 1, 2 and 3, which frames are shown in greater detail in FIGURES 12 and 14. In addition to these trawl reels, however, the winch of FIGURE 11 includes at its opposite ends pairs of reel flanges 91 which, with drums on which they are mounted, define reels 9. Each of these reels can be used to receive and manipulate a towing line attached to one wing of the trawl when it is being towed. Such towing line drums can be turned to wind in or pay out the towing lines independently of each other and independently of the rotation of any other drum of the winch.

Further, the multiple drum winch of FIGURE 11 is shown as including reel flanges 92 of a winch drum located between the port towing line drum 9 and the reel 64. These reel flanges with a winch drum carrying them define a reel 93 on which a try net may be wound. This drum also can be driven to wind in or pay out the try net independently of rotation of any other reel of the winch. Between the starboard towing line winch 9 and the reel 65 reel flanges 94 are shown, which are carried by another winch drum 95 rotatable independently of the other reels or drums of the winch. On this drum can be wound a utility lifting line which can run through a block on a boom overhead to be guided to any load which it is desired to hoist. Because of the greater length of this winch it will be desirable to mount it on the trawler deck by four feet supporting each strut 51' instead of the two feet supporting each strut 51 of the winch shown in FIGURES 1, 2 and 3.

For night operation it is desirable to provide a light mounted directly on the winch. Such a light conveniently can be carried by a standard 100 mounted directly on top of the winch end frame 50, as shown in FIGURES 1, 3 and 14. This standard supports a tube 101 swingable through approximately a half turn in the standard 100 and which tube can be secured in any desired swung position by a set screw 102. The light 103 is mounted on the end of the tube 101, and its illumination may be concentrated in a general area by a reflector 104. Electric current is supplied to the light through wires 105 passing through the interior of the winch end frame 50 as shown in FIGURE 14 from an electric box 106 mounted on the end frame, in which a light switch 107 controlling energization of the light is mounted, as shown in FIGURE 3. Power may be supplied to such light switch by a wire 108 passing from below the deck D upward to the winch end frame through an apertured deck fitting 109.

In use towing lines wound on drums 9 of the winch shown in FIGURE 11 or on separably operable towing winches alongside the trawl winch shown in FIGURE 1 extend aft over portions of the trawler rail which are spaced apart, and such towing lines extend thence downwardly into the sea and are attached to doors, to which doors the forward ends of the trawl curtains are attached. As the towing lines pull these doors through the water, the reaction of the water on the doors moves the doors widely apart and spreads the forward ends of the wings or curtains. In reeling in the trawl the towing lines are wound in until the doors are raised from the water, whereupon they are secured to stanchions at opposite rails of the trawler. The lines which connect the trawl to the doors and towing lines are then disconnected from the doors, and their ends are secured respectively to the anchor eyes 67 of the reels 64 and 65.

The drum 6 of the trawl winch described above is then turned in a direction such that the anchor eyes move upwardly and forwardly and then downwardly and rearwardly so that the divergent sections of the trawl will pass forwardly over the top of the winch drum 6 in the reels 64 and 65 as such sections are reeled in. During such reeling the divergent sections may be guided between the posts of the two pairs of upstanding guide posts disposed aft and generally in alignment with the four reel flanges 42, 61, 62 and 63. By moving between such posts the divergent sections are guided accurately onto the narrow reels 64 and 65 despite rolling or yawing of the trawler and the force of wind and waves on the trawl.

After at least portions of the divergent sections of the trawl have been wound on the two side reels 64 and 65, respectively, the portions of the divergent sections may be anchored temporarily to the trawler separately from the reels 64 and 65 to relieve these reels from the pull of such sections while portions of such sections adjacent to the trawl body are passed from the reels 64 and 65 through the notches 68 of flanges 61 and 62 into the central reel 66. Winding of the winch drum can then be resumed to wind the remaining portions of the divergent sections and then the central portion of the trawl and its associated gear onto the large central reel 66.

As the bosom of the trawl approaches the inner curtain guide posts, such posts can be swung downwardly or otherwise removed from the path of the trawl body so that it can pass without hindrance to the reel 66. The trawl body is still guided sufficiently accurately to the central reel by the outer guide posts which remain in place. Because these guide posts should be spaced apart a distance approximately equal to the spacing of the end reel flanges 42 and 63, however, reliance is placed on the flaring shape of the reel 66 to move the sides of the trawl body toward the center of this reel, especially during the initial portion of the trawl body winding operation, so that the trawl sides will not be snagged and torn by the flange notches 68.

I claim as my invention:

1. A winch for hauling trawls comprising a frame, a winch drum journaled in said frame for rotation relative thereto about a substantially horizontal axis, four flanges fixed on said drum and spaced lengthwise thereof including two axially outer flanges and two axially inner flanges located between said outer flanges, said inner flanges forming therebetween an intermediate trawl body reel, each outer flange and the adjacent inner flange defining therebetween a side reel, the drum portions of said side reels being of substantially equal diameter, the peripheries of said inner flanges having notches substantially in registry axially of said drum adapted for passage therethrough from said respective side reels to said intermediate trawl body reel of portions of divergent sections of the trawl, and means operatively connected to said drum for effecting conjoint rotation of all said flanges and said drum.

2. The winch defined in claim 1, in which the spacing of the peripheries of the inner flanges is such that the axial extent of the intermediate trawl body reel therebetween is at least half as great as the spacing between the peripheries of the outer flanges.

3. The winch defined in claim 1, in which each of the flanges is of a radial extent a plurality of times as great as the diameter of the drum.

4. The winch defined in claim 1, a notch in the periphery of an inner flange having a depth at least not appreciably exceeding one-quarter of the radius between the axis of the drum and the periphery of such flange.

5. The winch defined in claim 1, in which the adjacent sides of the inner flanges are inclined to form the reel therebetween flaring outwardly.

6. A winch for hauling trawls, comprising a frame, a winch drum journaled in said frame for rotation relative thereto about a substantially horizontal axis, four flanges fixed on said drum substantially perpendicular to the rotative axis thereof and spaced lengthwise of said drum to form three reels, each of said flanges being of a radial extent a plurality of times as great as the diameter of said drum, said flanges including two axially outer flanges and two axially inner flanges, forming an intermediate trawl body reel between said two axially inner flanges and two side reels at opposite sides of said intermediate trawl body reel between the respective outer flanges and the respective inner flanges adjacent thereto, each of said inner flanges having a notch in its periphery, the notches in said two inner flanges being substantially in alignment parallel to the axis of said drum and adapted for passage therethrough from said respective side reels to said intermediate trawl body reel of portions of divergent sections of the trawl, and means operatively connected to said drum for effecting simultaneous rotation of said three reels.

7. The winch defined in claim 6, the drum being of substantially the same diameter in all three reels.

8. The winch defined in claim 6, a notch in the periphery of an inner flange having a depth at least not appreciably exceeding one-quarter of the radius between the axis of the drum and the periphery of such flange.

9. In a winch, a winch frame, a drum journaled in said winch frame for rotation relative thereto, a bull gear secured to said drum, a drive pinion engaged with said bull gear, a casing enclosing said bull gear and pinion and mounted on said drum for rotation of said drum relative to said casing and for movement of said casing relative to said winch frame about the axis of said drum, and abutment means engaged between said casing and said winch frame and operable to limit movement of said casing relative to said winch frame about the axis of said drum.

10. The combination defined in claim 9, and pinion drive means mounted on the casing and operatively connected to drive the pinion.

References Cited

UNITED STATES PATENTS

| | | | |
|---|---|---|---|
| 449,207 | 3/1891 | Cunningham | 242—117 |
| 846,575 | 3/1907 | Larson | 254—184 |
| 1,108,576 | 8/1914 | Hall | 242—117 |
| 1,253,541 | 1/1918 | Sivard | 254—184 |
| 1,352,653 | 9/1920 | Brown | 254—186 |
| 1,462,388 | 7/1923 | Smith | 242—117 |
| 1,621,714 | 3/1927 | Dyer | 242—117 |
| 1,811,966 | 6/1931 | Proper | 242—117 |
| 1,884,821 | 10/1932 | Osgood | 254—184 |
| 2,042,674 | 6/1936 | Martin | 254—184 |
| 2,435,580 | 2/1948 | Glennon | 254—184 |
| 2,478,615 | 8/1949 | Zeilman | 254—184 |
| 2,645,455 | 7/1953 | Rowe | 254—137 |
| 2,670,177 | 2/1954 | Pearson | 254—184 |
| 2,696,366 | 12/1954 | Eskew | 254—185 |
| 2,771,268 | 11/1956 | Rosewall | 254—186 |
| 3,027,148 | 3/1962 | Hegel | 254—184 |

FOREIGN PATENTS

| | | |
|---|---|---|
| 5,393 | 4/1901 | Great Britain. |
| 702,414 | 1/1954 | Great Britain. |
| 1,154,258 | 10/1957 | France. |
| 161,549 | 12/1957 | Switzerland. |

EVON C. BLUNK, *Primary Examiner.*

H. C. HORNSBY, *Assistant Examiner.*